Sept. 9, 1958
A. ANDERSON
2,851,163
COOLANT FILTER
Filed Dec. 29, 1954
2 Sheets-Sheet 1
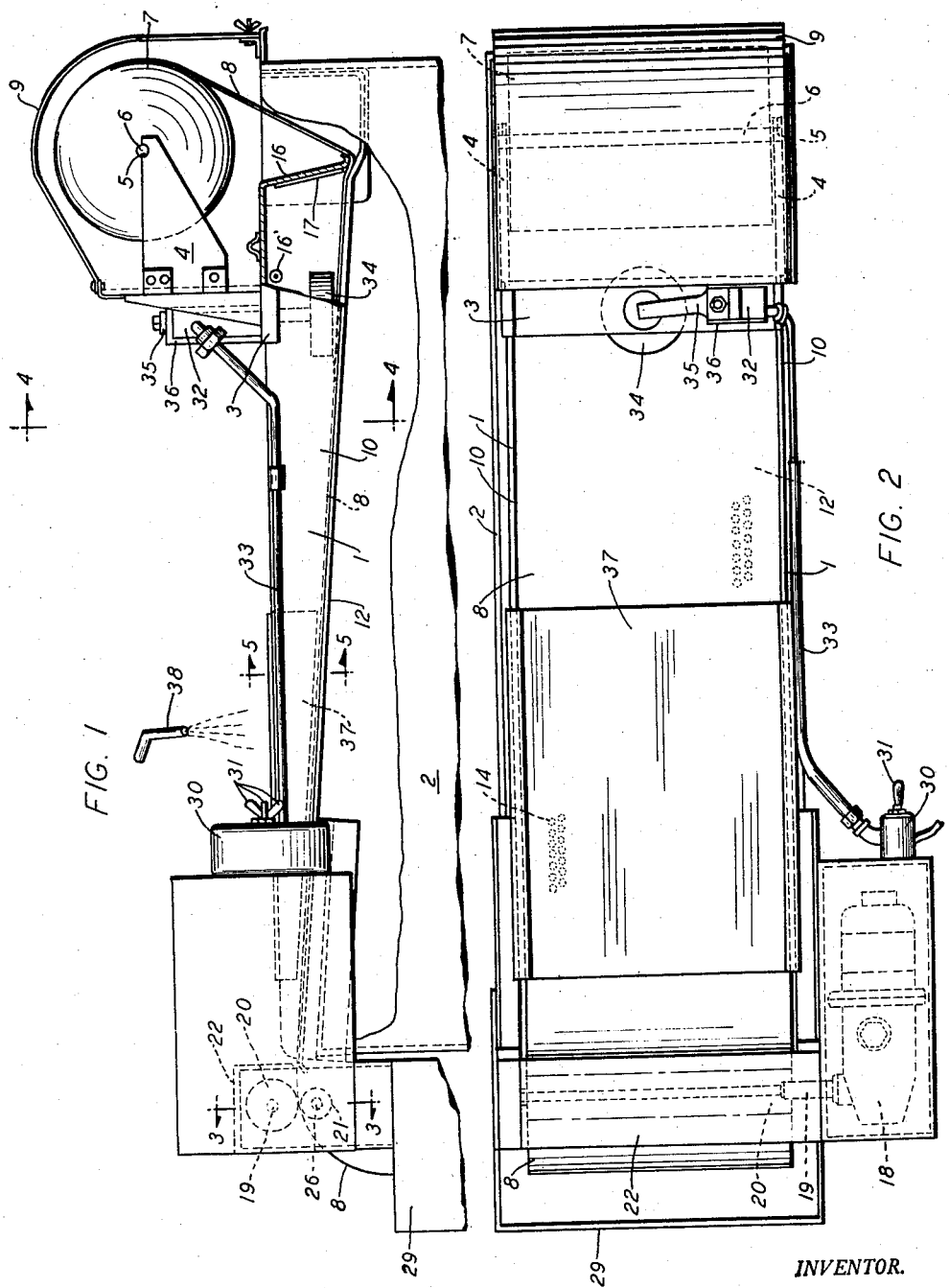
INVENTOR.
AXEL ANDERSON
BY
Schroeder, Hofgren, Brady + Wegner
ATTORNEYS

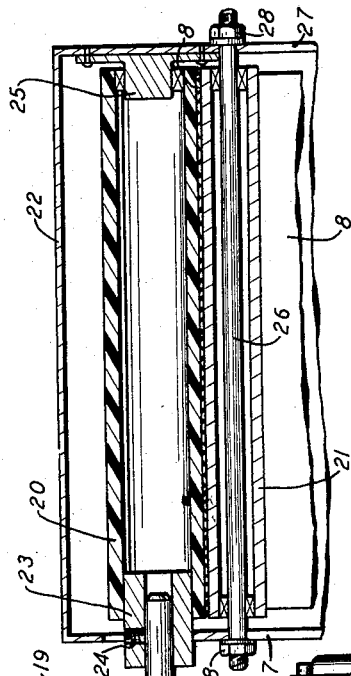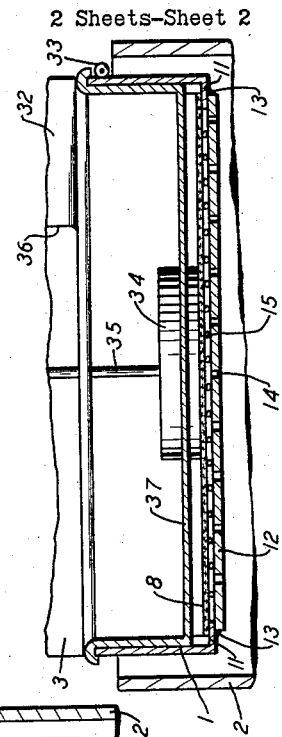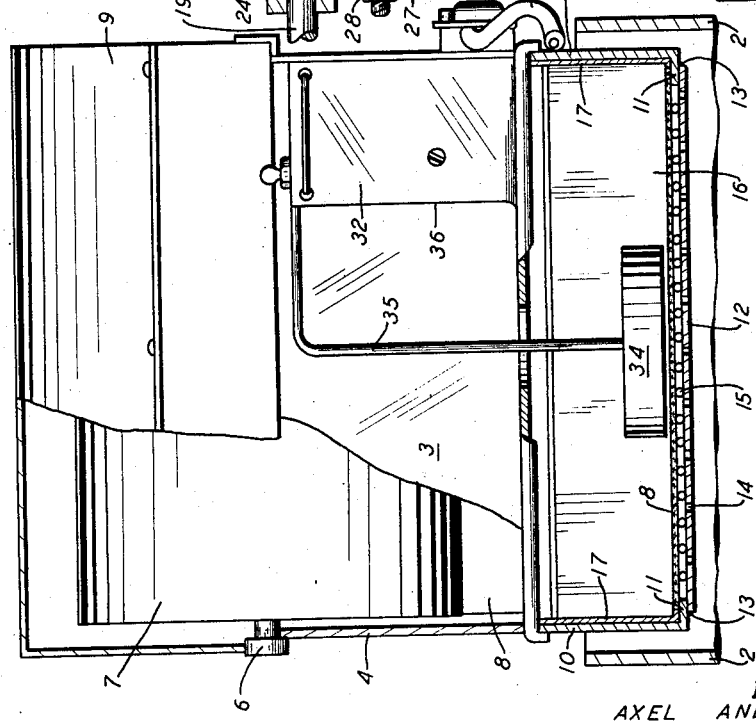

United States Patent Office 2,851,163
Patented Sept. 9, 1958

2,851,163

COOLANT FILTER

Axel Anderson, Rockford, Ill., assignor, by mesne assignments, to Sundstrand Machine Tool Co., Rockford, Ill., a corporation of Illinois Application December 29, 1954, Serial No. 478,371

8 Claims. (Cl. 210—387)

This invention relates to a coolant filter, and more particularly to an apparatus to be used with machine tools to filter metallic particles from the liquid coolant discharged from machine tools so that the coolant may be reused.

In the past, in liquid filters wherein the coolant liquid is passed through a filter material, the material has been supported and carried on an endless perforated belt conveyor or moved by rollers, or both to present new sections of material to the coolant fluid. It is necessary to pass all of the liquid through the filter material and, heretofore, this has been accomplished by means which raise the outer edges of the filter material to form what may be termed a "pocket" for the fluid, thus utilizing only part of the filtering surface and wasting the upturned edges of the material since liquid does not ordinarily contact therewith.

The general object of this invention is to provide a new and improved coolant filter of the character described in which the discharged coolant is filtered through a flat web of filter material supported on a flat elongated pan bottom which has a plurality of holes in the central portion thereof, the flat edges of the web forming a seal with the narrow imperforate sides of the pan bottom to utilize substantially all of the filter material surface and insure that all of the coolant passes through the filter material before passing through the holes in the bottom of the pan to a coolant supply tank positioned below.

Another object of this invention is to provide a new and improved filter for machine tool coolants comprising an elongated pan which may be supported on a coolant supply tank, the pan having an inclined bottom which is perforated except along its longitudinal edges, a plurality of spaced parallel wires extending along the inclined bottom, and a section of filter material substantially the same width as said pan adapted to be disposed substantially flat and slidably supported on the wires secured to the pan bottom, the edges of the filter material forming a seal with the unperforated longitudinal edges of the pan bottom to prevent the passage of any non-filtered coolant around the edges of the filter material so that unfiltered coolant discharged into the pan from a machine tool passes through the filter material before passing through the holes in the pan bottom into the coolant supply tank.

A further object of this invention is to provide a new and improved coolant filter comprising an elongated pan member with a generally perforated bottom sloping downwardly from one end to the other to form shallow and deep ends respectively, the pan being adapted for mounting on a machine tool coolant supply tank, a plurality of parallel wires extending along the length of the pan and secured to the bottom of the pan, a web of filter material substantially the width of the pan supported in a substantially flat plane on the wires, the edges of the filter paper forming a seal with the non-perforated sides or edges of the pan bottom, means for rotatably supporting a roll of the filter material adjacent the deepest portion of the pan, roller means positioned at the shallow end of the pan for unwinding the filter material from the roll and slidably advancing it along said wires, a motor for driving the roller means, a discharge chute supported on the pan to deflect unfiltered coolant from a machine tool onto the top of the filter material to be discharged through the perforated bottom of the pan into the coolant supply tank after passing through said material, all of the coolant passing through the filter material as a result of the sealing effect at the sides or edges of the pan bottom and substantially all of the filter surface being utilized as a result of the flat disposition of the filter material, and float control means positioned in the deepest portion of the pan for actuating the motor when the level of coolant above the material rises to a predetermined level due to clogging of the material with metallic particles.

Other objects and advantages will become apparent from the following detailed description taken in connection with the accompanying drawings, in which:

Fig. 1 is a front elevation of the invention mounted on a coolant supply tank, parts of the front wall of the supply tank and the side of the pan being broken away to better show the invention;

Fig. 2 is a top plan view of the invention;

Fig. 3 is a fragmentary vertical sectional view taken along line 3—3 of Fig. 1 showing the roller means;

Fig. 4 is a vertical sectional view taken along line 4—4 of Fig. 1 showing the filter material supported on the wires and the sealing engagement of the edges of the filter material with the non-perforated edges of the pan; and Fig. 5 is a fragmentary end sectional view taken along line 5—5 of Fig. 1 showing the discharge chute supported on and between the side members of the pan.

While the invention herein described is a preferred embodiment, it is not intended to limit the invention to the specific form and arrangements shown, it being contemplated that various changes may be made by those skilled in the art without departing from the spirit and scope of the appended claims.

Referring now to Fig. 1, the coolant filter includes an elongated inclined trough-like pan 1 removably supported on and above a coolant supply tank 2. A member 3 is removably supported on pan 1 and has a pair of arms 4, each having an open recess 5 on the upper surface for rotatably supporting a shaft 6 carrying a roll 7 of filter material, as filter paper 8. A removable cover 9 is provided for ease in replacing the roll of filter material 7.

As best shown in Fig. 4, the pan 1 may be constructed of two spaced vertical side walls, as members 10 having flanges 11 extending slightly inwardly, and a pan bottom, as plate 12 welded to the bottom surface of flanges 11 as at 13. The pan bottom, as plate 12, is generally perforated as indicated by representative through holes 14 shown in Figs. 2, 4 and 5. A plurality of wires 15 are supported on the upper surface of pan bottom 12 longitudinally and parallel to each other. Wires 15 are held in place at their extremities by being bent downwardly and passing through the holes 14 in the pan bottom 12. The presence of parallel wires 15 on pan bottom 12 produces a corrugated surface effect and provides a plurality of skidways to reduce the contact surface of a web of filter paper 8 advanced or pulled along the pan bottom 12 after being unwound from the roll 7, thus substantially eliminating the tendency of the filter material 8 to rip.

Supported between the pan walls 10 is a guide member 16, Fig. 1, extending downwardly into the pan 1 below roll 7. The guide member 16 serves to direct the unwound filter paper 8 onto pan bottom 12 and wires 15 as it is advanced through the pan 1. Guide member 16 extends the full width of pan 1 and has resilient edgings 17 which act as seals adjacent vertical side members 10. As guide member 16 extends downwardly closely adjacent to pan bottom 12, only allowing space for the passage therebetween of filter paper 8, it serves substantially as an end wall for pan 1. To allow guide member 16 to be swung upward to provide clearance for inserting a new roll of the filter material, guide member 16 is pivotally mounted to the side walls 10 of pan 1 by means of pins 16'.

Filter paper 8 is substantially the width of pan 1 so that when the web disposed on the pan bottom 12 in a substantially flat position is wetted by the coolant above it, the longitudinal edges of the filter paper 8 form a seal with the non-perforated sides or edges of the pan bottom 12, as to the upper surfaces of the inwardly extending non-perforated flanges 11 of vertical side members 10 in the embodiment illustrated, Figs. 4 and 5. This sealing effect insures that all of the unfiltered coolant liquid above the web of filter paper 8 must pass through the filter paper 8 before being discharged through holes 14 in pan bottom 12 to supply tank 2, none of the unfiltered coolant liquid being able to pass around the edges of the web of filter paper 8. It is evident that substantially all of the filtering surface will be utilized because of the flat disposition of the web of filter paper 8 on pan bottom 12.

Roller means are also provided at the opposite end of the pan 1 to grip the filter material 8 and to pull or advance it through pan 1 along stationary pan bottom 12 and wires 15. Thus, as the section of filter paper 8 being utilized becomes so clogged with filtered residue as to substantially reduce the passage of coolant therethrough, a fresh section of filter paper 8 may be advanced onto pan bottom 12. The roller means are driven by a driving motor 18 through a shaft 19, as shown in Fig. 2.

The roller means are best shown in Fig. 3 wherein two rollers 20 and 21 are rotatably and horizontally supported in a vertical arrangement in a housing 22 supported adjacent the shallowest portion of pan 1 opposite the roll 7 of filter material 8. Upper roller 20 may be of a resilient material, such as rubber, and is driven through shaft 19 and a driving member 23 which is non-rotatably received in roller 20, shaft 19 being secured in driving member 23 by a set screw 24. The other end of roller 20 is journalled on a projection 25 secured to housing 22. The lower roller 21 may be of steel and is journalled on a shaft 26. Shaft 26 may be adjusted in a vertical direction in vertical slots 27 provided in each side of housing 22 and locked in place by means of lock nuts 28 carried on the threaded ends of shaft 26. The filter paper 8 is received between the two rollers 20 and 21, roller 21 being locked in place to maintain sufficient frictional contact with roller 20 so that on rotation thereof, the filter paper 8, positioned therebetween, will be advanced through pan 1 and after passing between rollers 20 and 21 will be deposited in a discharge bin 29 positioned below the roller means to be thrown out or cleaned for reuse.

Driving motor 18 has a switch 30 which has a handle 31 which may be placed in any of three positions, as shown in Fig. 1; "off," "manual," and "automatic." When handle 31 is placed in the "automatic" position, the driving motor 18 is operated through a float-controlled switch 32, which is connected to motor 18 through a conduit 33. A float 34 is positioned in the unfiltered coolant liquid in pan 1 at the deepest portion of the pan, and is operably connected to switch 32 by an arm 35. Switch 32 is positioned in a housing 36 attached to member 3.

As the filter paper 8 positioned on pan bottom 12 becomes clogged with metallic particles, the level of the coolant liquid rises, carrying with it float 34 which at a predetermined level actuates switch 32 through the movement of arm 35. Thus, driving motor 18 is started and rollers 20 and 21 advance a fresh section of filter paper onto pan bottom 12. The level of the coolant then falls, so that float 34 opens switch 32 and stops the driving motor 18, until the fresh filter surface becomes clogged sufficiently for the float 34 to again actuate switch 32.

The roller means can also be adapted to run continuously while the particular machine tool it is associated with is being operated, there being no need for a float control in such an installation.

To prevent the discharge of the unfiltered coolant directly from the machine tool onto filter paper 8 in pan 1, an inclined discharge chute 37, Figs. 1 and 2, is removably supported on pan 1 between the vertical walls of the pan for a substantial portion of the length of the pan. Thus, the unfiltered coolant is discharged onto chute 37, as from nozzle 38 on a machine tool (not shown), from which it flows by gravity into the pan 1 to be filtered through filter paper 8.

This coolant filter is designed to be removably supported on and above the coolant supply tank employed for the particular machine tool, so that the filtered coolant passes through the holes 14 in pan bottom 12 directly into the coolant supply tank from which it may be reused in the machining operation.

I claim:

1. A coolant filter apparatus comprising, in combination; an elongated pan adapted to be removably supported on a machine tool coolant supply tank to receive the non-filtered coolant liquid from the machine tool, said pan having two side walls and an inclined bottom perforated except along its longitudinal edges, means for rotatably supporting a supply roll of filter paper adjacent the deepest portion of said pan, a pair of rollers horizontally supported at the other end of said pan and adapted to receive and grip the filter paper therebetween, one of said rollers being adjustably mounted so that the pressure between the two rollers may be varied to adequately grip the filter paper to advance the paper along the perforated pan bottom upon rotation of said rollers, a motor for driving said rollers, the filter paper extending substantially the width of the pan so that the edges of the paper form a seal with the non-perforated edges of the pan bottom so that all of the coolant liquid must pass through the filter paper to be discharged into the coolant supply tank, a plurality of wires extending longitudinally on and secured to the upper surface of the perforated pan bottom, said wires being parallel so as to provide a plurality of parallel supporting skidways for the filter paper, a guide member supported on said pan and extending downwardly below the roll of filter paper to direct the filter paper onto the perforated pan bottom, and a discharge chute removably supported on said pan and extending a portion of the length thereof adapted to deflect the unfiltered coolant from a machine tool onto the filter paper.

2. A coolant filter apparatus for use with a machine tool comprising, in combination; an elongated inclined pan for receiving the unfiltered coolant having two vertical side walls and a centrally perforated bottom, said pan adapted to be mounted on and above a machine tool coolant supply tank, a plurality of wires extending longitudinally on the pan bottom parallel to each other, means for rotatably supporting a roll of filter media adjacent one end of said pan, the filter media being substantially the same width as the pan and adapted when unwound to be supported on and advanced along said wires and perforated pan bottom in a flat position, the flat edges of the filter media forming a seal with the non-perforated sides of the pan bottom so that all of the coolant passes through the filter media before entering the coolant supply tank, efficient utilization of the filter surface being realized through the flat disposition of the unwound filter media, a guide member substantially the width of said pan extending downwardly therein and positioned to direct the filter media onto the perforated pan bottom and also to substantially act as an end wall at the deeper end of said inclined pan, a pair of rollers horizontally positioned adjacent the end of said pan opposite the roll of filter media and adapted to grip the filter media between them so that on rotation of said rollers fresh filter media is advanced along said wires and perforated pan bottom with the clogged filter media being deposited in a discharge bin, and a motor operably connected to drive one of said rollers.

3. A coolant filter apparatus comprising, in combination; an elongated pan for receiving coolant from a machine tool and having a bottom perforated generally between the longitudinal sides thereof, said pan being adapted to be removably supported on a machine tool coolant supply tank, the perforated bottom having a parallel series of wires extending longitudinally thereon, means for horizontally supporting a supply roll of filter paper substantially the same width as said pan adjacent one end of said pan, a pair of rollers horizontally supported adjacent the other end of said pan and adapted to grip the filter paper so that on rotation of said rollers a web of the filter paper is unwound from the roll, a guide member positioned so that the web of filter paper disposed between the gripping rollers and the supply roll is directed onto the perforated pan bottom, there being a minimum surface contact between the flatly disposed filter paper and pan bottom because of the wires positioned thereon, the flat edges of the filter paper forming a seal with the non-perforated sides of the pan bottom to prevent the passage of unfiltered coolant around the filter paper and into the coolant supply tank, and means for driving said rollers to advance a fresh web of filter paper to said pan.

4. A coolant filter apparatus comprising, in combination; an elongated pan having a plurality of holes centrally disposed in the bottom thereof adapted to be non-fixedly mounted on a machine tool coolant supply tank, said pan adapted to receive the discharge coolant from a machine tool, a parallel series of wires supported on the bottom of said pan and secured thereto, means for rotatably supporting adjacent one end of said pan a roll of filter material substantially the width of said pan, a section of the filter material adapted to be unwound from the roll and supported in a flat position on the wires and pan bottom, the flat edges of the filter material sealing themselves to the non-perforated longitudinal edges of the pan bottom so that all of the coolant discharged from said pan, through the holes therein, into the coolant supply tank is filtered through the filter material, a guide member supported on the pan and extending downwardly below the roll of filter material to guide the unwound section of filter material onto the bottom of said pan, a discharge chute removably supported on and along a substantial portion of said pan adapted to deflect the discharge coolant from a machine tool onto the section of filter material, a pair of rollers positioned at the end of the pan opposite the roll of filter material adapted to grip the filter material to advance the material along the pan bottom upon rotation thereof, and means for rotating said rollers.

5. A coolant filter apparatus comprising, in combination; an elongated pan adapted to be removably supported on a machine tool coolant supply tank to receive the discharge coolant from the machine tool, said pan having two side walls and an inclined generally perforated bottom, the bottom being non-perforated along its longitudinal edges, means for rotatably supporting a roll of filter material adjacent the deep end of said pan, a pair of rollers horizontally supported adjacent the shallow end of said pan and adapted to receive and grip the filter material therebetween and operable to unroll and advance the material along the perforated pan bottom upon rotation of said rollers, a motor for driving said rollers, the filter material extending substantially the width of the pan bottom in one plane so that the flat edges of the unrolled material form a seal with the non-perforated longitudinal edges of the pan bottom, a series of spaced parallel wires extending longitudinally on the upper surface of the perforated pan bottom adapted to reduce the surface contact of the filter material with the pan bottom, a guide member supported on said pan and adapted to direct the filter material from the roll onto the pan bottom, and an inclined discharge chute removably supported on and above a portion of the length of said pan adapted to initially receive the discharge coolant from a machine tool, from which chute the coolant flows by gravity onto the filter material disposed on the pan bottom.

6. A coolant filter apparatus comprising, in combination; a pan adapted to receive unfiltered coolant from a machine tool and having a generally perforated bottom with imperforate longitudinal edges, said pan being mounted on and above a coolant supply tank, means on the pan bottom defining a longitudinally extending corrugated surface so as to provide skidways for a web of filter material flatly disposed thereon, and means for replacing a clogged web of filter material with a fresh web of material from a supply roll, the filter material being substantially the width of said pan so that the flat edges of the web of filter material form a seal with the imperforate edges of the pan bottom to prevent the passage of unfiltered coolant around the edges of the web of filter material into the coolant supply tank, the web of filter material being disposed on the bottom of the pan in one plane to allow substantially complete utilization of the filter material.

7. A coolant filter apparatus comprising, in combination; an elongated pan having a bottom with a plurality of holes spaced from and between the edges thereof, said pan being adapted to rest on a coolant supply tank for a machine tool to receive the discharge coolant therefrom, a parallel series of wires supported along the length of the bottom of said pan, means on said pan for rotatably supporting a roll of filter material substantially the width of said pan adjacent one end thereof, a web of the material adapted to be unwound and supported on said wires in a substantially flat position, the flat edges of the filter material sealing themselves to the imperforate edges of the pan bottom when wetted by the coolant so that all of the coolant discharged into the coolant supply tank through the holes in the pan bottom has passed through the filter material, a guide member supported on said pan to direct the unwound web of filter material onto said wires, a discharge chute adapted to be non-fixedly mounted on said pan and positioned to deflect the discharge coolant from a machine tool onto the web of filter material, a pair of rollers positioned at the end of the pan opposite the roll of filter material adapted to grip the web of filter material and to advance the material along the pan bottom upon rotation thereof, and means for rotating said rollers.

8. A coolant filter apparatus comprising, in combination; an elongated pan having a substantially flat bottom with walls extending upwardly therefrom for confining a level of discharge coolant and adapted to underlie a discharge coolant outlet from a machine tool, said pan bottom being adapted to overlie a coolant supply tank and having relatively narrow imperforate longitudinal edges and the portion therebetween perforated with a plurality of spaced drain holes, a section of filter material substantially the width of the pan supported therein in a flat position with the major central portion of the filter material overlying the perforated portion of the pan bottom means above the perforated portion of the pan bottom providing spaced longitudinal areas of contact with the filter material and along which the material may slide, and with the flat edges of the filter material forming a seal with the imperforate edges of the pan bottom to prevent any discharge coolant from passing around the edges of the filter material, thus insuring that all of the discharge coolant in the pan passes through the filter material before entering the coolant supply tank, and means for slidably replacing a clogged section of filter material with a fresh section of material.

References Cited in the file of this patent

UNITED STATES PATENTS

| | | |
|---|---|---|
| 794,631 | Milne | July 11, 1905 |
| 1,958,279 | Morgan | May 8, 1934 |
| 2,665,812 | Crane | Jan. 12, 1954 |
| 2,736,434 | Yacoe | Feb. 28, 1956 |